April 9, 1929.  F. V. MALOON  1,708,447
MOLDING APPARATUS
Filed Feb. 1, 1928
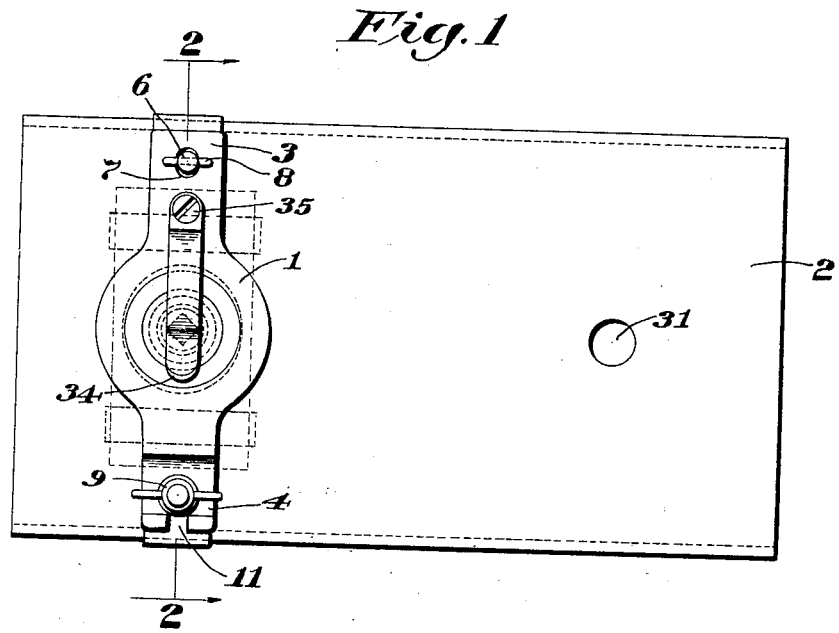
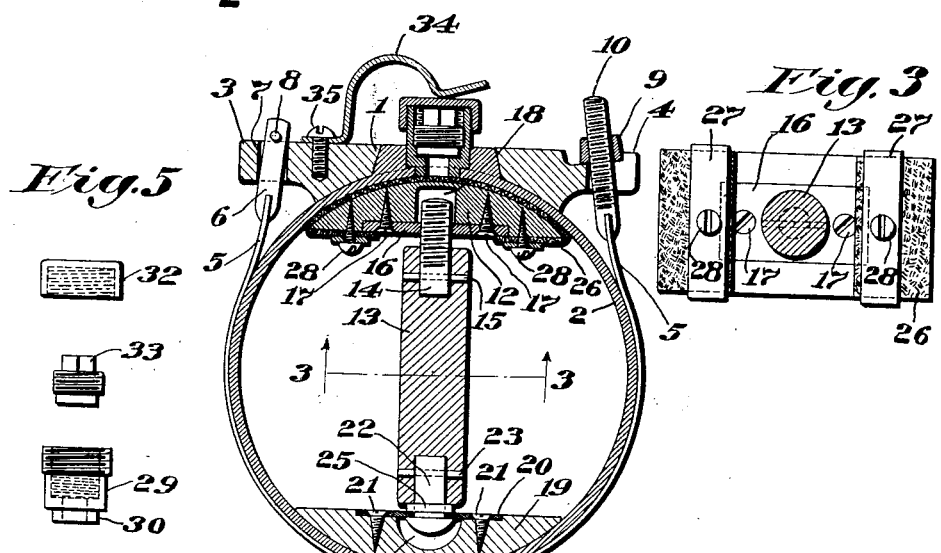
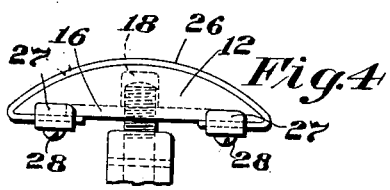
Inventor
Frederick V. Maloon,
By his Attorney Patented Apr. 9, 1929.

1,708,447

UNITED STATES PATENT OFFICE.

FREDERICK V. MALOON, OF BOSTON, MASSACHUSETTS, ASSIGNOR TO JAMES SUGDEN COMPANY, OF BOSTON, MASSACHUSETTS, A CORPORATION OF MASSACHUSETTS.

MOLDING APPARATUS.

Application filed February 1, 1928. Serial No. 251,051.

This invention relates to molds and more especially to molding apparatus designed particularly for the purpose of forming reinforced areas or bosses of metal upon the sheath or sleeve of a cable joint, and for use in the mounting of a plug or cup body in such reinforced area.

According to the method now preferred of splicing lead covered cables of the type much used under ground for the transmission of electrical power and for other electrical purposes, the lead covering is stripped off near the meeting ends of the sections to be spliced, the individual conductors are properly joined and insulated, and a lead sleeve or sheath is then drawn over the joint and its opposite ends are soldered or fused to the undisturbed lead covering of each cable length. An insulating medium, such as grease or wax, is then forced into the sleeve or sheath to displace the air and fill up the voids, and for this purpose the sheath usually is equipped with two grease plugs or cups, the insulating compound being introduced through one, while air escapes through the other.

For the purpose of mounting these grease plug or cup bodies in a sheath or sleeve, it has been the usual practice to expand portions of the sleeve to produce bosses, and then to make a hole through each boss to receive the shank of the plug or cup body. This practice, however, is open to the objection that the expanding of the wall of the sleeve to produce the boss necessarily draws the metal, reduces the thickness of the wall at this point, and consequently forms a weakened area in the sleeve. This is objectionable not only because the sleeve is mechanically weakened, but also because the thickness of the wall is reduced in the regions where it is most likely to be subjected to the action of electrolysis.

The present invention deals with the problems presented by these conditions, and it aims to devise an apparatus with which the mounting of the grease plug or cup bodies in a sleeve can be performed more quickly and economically, and which will result in strengthening the sleeve instead of weakening it.

An illustrative embodiment of the invention is shown in the accompanying drawings, in which, Figure 1 is a plan view of said embodiment applied to a section of a joint-covering sleeve, with a plug body mounted in a boss that has been built up within the mold;

Fig. 2 is a view in vertical section on line 2—2 of Fig. 1, showing also an internal brace for preventing distortion of the sleeve;

Fig. 3 is a view in section on the line 3—3 of Fig. 2, looking in the direction of the arrows, showing details of the upper end of the internal brace;

Fig. 4 is an elevation of said upper end of the internal brace;

Fig. 5 shows in elevation the component members of a typical grease plug or cup in disassembled relation; and Fig. 6 is a vertical section of a portion of the joint-covering sleeve drilled and ready to receive the grease plug or cup.

Referring to the drawings, it will be seen that the body 1 of the device forming the molding member proper, is provided with a central aperture of the shape and size of the boss which is to be formed upon the joint-covering sleeve 2. It also has opposite arms 3 and 4 extending therefrom to afford anchorages for the means used to hold it in the desired position upon the sleeve. In the present form, the holding means comprises a strap 5, preferably consisting of a band of metal, one end of which is fastened to the arm 3 of the body by a member 6 which is welded to the strap 5 and is passed through a hole 7 in the arm 3 and secured against withdrawal by a cross-pin 8 fixed in said member above such arm. This strap 5 is adapted to encircle the sleeve and to be drawn tight by a thumb-nut 9 threaded on a screw-threaded stud 10 which is secured to the other end of the strap, said stud 10 being located in an open ended slot 11 in the arm 4. By turning down the thumb-nut 9 against the upper side of the arm 4 both the body and strap may be clamped tightly on the sleeve 2.

The underside of the body is shaped, as shown clearly in Fig. 2, to conform to the cylindrical exterior of a sleeve of a certain standard diameter. A tight fit of the body against the sleeve is essential to prevent the creeping or escape of the molten metal or material from which the boss is to be built up; and in order to prevent undue distortion of the relatively soft lead sleeve under the very considerable pressure produced by turning down the thumb-nut 9, I provide as an important part of my invention an internal brace adapted to support the wall of the sleeve 2 throughout substantially the whole area with which the body of the mold is in contact. This internal brace comprises a pair of blocks shaped for engagement with the interior wall of the sleeve, and a spreader. The upper block 12 of fibre, metal, or other suitable material, has an upper surface shaped to conform to the interior of the sleeve. It is pressed upward from within against the wall of the sleeve by the spreader which includes a short shaft 13 equipped with an axially disposed stud 14 secured therein by a cross-pin 15. This stud is in screw-threaded engagement with a plate 16 attached by screws 17—17 to the under side of the block, a recess 18 being formed in the lower side of the block to accommodate the upper end of the stud. The lower end of the shaft 13 is in free swivelling engagement with the lower block 19, which also has a surface conforming to the interior of the sleeve 2. As shown, a plate 20 is attached by screws 21—21 to the block 19, and is provided with a central hole to receive a headed stud 22 axially fixed in the shaft 13 by a cross-pin 23, the said stud having its head located below the plate 20 in a recess 24 in said block. A washer 25 may be placed on the stud between the shaft 13 and plate 20 to facilitate the relative rotation of the two latter members. Preferably, the convex upper surface of the upper block 12 is clothed with a layer 26 of asbestos or other fabric to bear against the sleeve's inner surface and prevent leakage of the molten metal into the interior of the sleeve. This fabric layer 26 is held in any suitable manner, as by being folded back along the underside of the block and held there by clips 27—27 of metal secured by screws 28—28 driven into the block. It will be seen that manual rotation of the shaft 13 in the proper direction while the two blocks are held from turning by the interior conformation of the sleeve will operate to spread the blocks apart.

A typical grease plug or cup is shown in Fig. 5 in disassembled relation, and comprises a cup proper or body 29 having an axial passage and a neck 30 of reduced diameter to fit in a hole, such as 31, Fig. 6, formed for it in the wall of the sleeve 2, the neck being of a length to reach substantially through said wall. The cup has an internally threaded recess to receive a threaded plug 33, and is externally threaded for a part of its length to receive the internally threaded cap 32.

The method of using the device to mount a grease plug or cup in the sleeve consists in forming a suitable hole 31 in the sleeve 2 at the proper point, tinning the outside of the sleeve thereabout, centering the central aperture of the body 1 on the sleeve over said hole 31, passing the strap 5 about the sleeve, inserting the threaded member 10 in the slot 11, and tightening the thumb-nut 9 to a slight degree. Then the internal brace is inserted in the sleeve with the clothed block underlying the body 1, and the shaft 13 is rotated manually to expand said brace. The thumb-nut 9 now is screwed down tightly, thus clamping the body 1 firmly against the exterior of the sleeve. The lower surface of the body 1 and the cooperating surface of the block 12 may not agree exactly in contour with the curvature of the sleeve 2, and thus may produce a slight local distortion of that part of the sleeve which is clamped securely between these two members. Such distortion, however, need not be a serious factor. Next the neck 30 of a grease plug, the lower part of which preferably has been tinned, is inserted in the hole 31, and an arched presser finger 34, swinging on a screw 35 in the body, is brought around to stand with its extremity over the grease plug. The cap 32 of the grease plug is now backed off against this extremity, thus pressing the plug firmly in place in the sleeve. The boss is then built up around the grease plug and within the central aperture in the body, the most satisfactory material for this purpose being solder, applied a little at a time while the parts are kept at a rather high temperature by the flame of a blow torch played upon them throughout the operation. The progressive building up of the boss in this manner produces a satisfactory union of the material of the boss with the material of the sleeve and of the grease plug which cannot be obtained by pouring molten lead or solder into the mold. The body 1 preferably is made of steel or cast iron, and the exterior thereof is treated in any suitable way to oxidize it in order to prevent the solder from adhering to it. When the material of the boss has cooled and set, the mold is unstrapped and lifted off, and the internal brace is removed, leaving the grease plug firmly mounted in the boss formed on the sleeve. The sleeve also will be found clean and smooth inside with no projections of grease plug or solder within.

The apparatus provided by this invention reduces the time involved in mounting the grease plug or cup bodies in the sleeve, and produces a superior final construction, the sleeve being reinforced and thickened instead of being weakened, as has been the practice heretofore.

While I have herein shown and described a preferred embodiment of my invention, it will be understood that the invention may be embodied in other forms without departing from the spirit or scope thereof.

Having thus described my invention, what I desire to claim as new is:

1. A mold for use in forming a boss upon a sleeve comprising, in combination, a body adapted to fit against the surface of said sleeve and having an aperture of the shape of such boss opening against said surface, and means cooperating with said body to encircle the said sleeve to press the body against the sleeve.

2. A mold for use in forming a boss upon a sleeve comprising, in combination, a body adapted to fit against the surface of said sleeve and having an aperture of the shape of such boss opening against said surface, a strap adapted to encircle said sleeve to clamp said body thereto, and means for fastening said strap to said body including a screw threaded connection adjustable to press said body tightly against said surface.

3. A mold for use in forming a boss upon a sleeve comprising, in combination, a body adapted to fit against the outer surface of said sleeve and having an aperture of the shape of such boss opening against said surface, means cooperating with said body and sleeve to clamp said body thereagainst, and supporting means for the inner surface of said sleeve adapted to brace such surface against distortion under the pressure of said body.

4. A mold for use in forming a boss upon a sleeve comprising, in combination, a body adapted to fit against the outer surface of said sleeve and having an aperture of the shape of such boss opening against said surface, means cooperating with said body and sleeve to clamp said body thereagainst, and a brace for bearing against the inner surface of said sleeve and adapted to be expanded to oppose the inward pressure exerted by said body and said clamping means.

5. A mold for use in forming a boss upon a sleeve comprising, in combination, a body adapted to fit against the surface of said sleeve and having an aperture of the shape of such boss opening against said surface, a strap adapted to encircle said sleeve to clamp said body thereto, means for fastening said strap to said body including a screw threaded connection adjustable to press said body tightly against said surface, and an expansible brace for bearing against the inner surface of the sleeve and supporting it against the pressure of said body and strap.

6. A mold for use in mounting grease plugs in the joint covering sleeves of cables comprising, in combination, a body adapted to fit against the surface of said sleeve and having an aperture opening against said surface, and means for supporting a grease plug in said aperture and in contact with said sleeve.

7. A mold for use in soldering grease plugs in the joint covering sleeves of cables comprising, in combination, a body adapted to fit against the surface of said sleeve and having an aperture opening against said surface, means for holding a grease plug against the sleeve and in said aperture, and means cooperating with said body for clamping it against said sleeve.

8. A mold for use in soldering grease plugs in the joint covering sleeves of cables comprising, in combination, a body adapted to fit against the surface of said sleeve and having an aperture opening against said surface, means for holding a grease plug in said aperture and against the sleeve, a strap connected at one of its ends to said body and adapted to encircle the said sleeve, and screw threaded means for fastening the other end of said strap to said body, whereby the body may be pressed tightly against said surface.

9. A mold for use in soldering grease plugs in the joint covering sleeves of cables comprising, in combination, a body adapted to fit against the surface of said sleeve and having an aperture opening against said surface, means for holding a grease plug against the sleeve and in said aperture, means cooperating with said body for clamping it against said sleeve, and supporting means for the inner surface of said sleeve adapted to brace said surface against distortion under the pressure of said body.

10. A mold for use in soldering grease plugs in the joint covering sleeves of cables comprising, in combination, a body adapted to fit against the surface of said sleeve and having an aperture opening against said surface, means for holding a grease plug in said aperture and against the sleeve, a strap connected at one of its ends to said body and adapted to encircle the said sleeve, screw threaded means for fastening the other end of said strap to said body, whereby the body may be pressed tightly against said surface, and an internal brace adapted to bear against the inner surface of the said sleeve and to be expanded to oppose the inward pressure exerted by the said body.

11. In a device for use in mounting grease plug bodies in holes provided for their reception in the joint covering sleeves of cables, a member conforming substantially to the contour of the inner surface of the sleeve in the neighborhood of one of said holes, and screw threaded means associated with said member to press it firmly against said inner surface.

12. In a device for use in mounting grease plug bodies in holes provided for their reception in the joint covering sleeves of cables, the combination of a plurality of members adapted to engage the inner surface of the sleeve, and parts connecting said members and adapted for manipulation to spread them apart and thereby to press them firmly against said interior surface.

FREDERICK V. MALOON.